Figure 1:
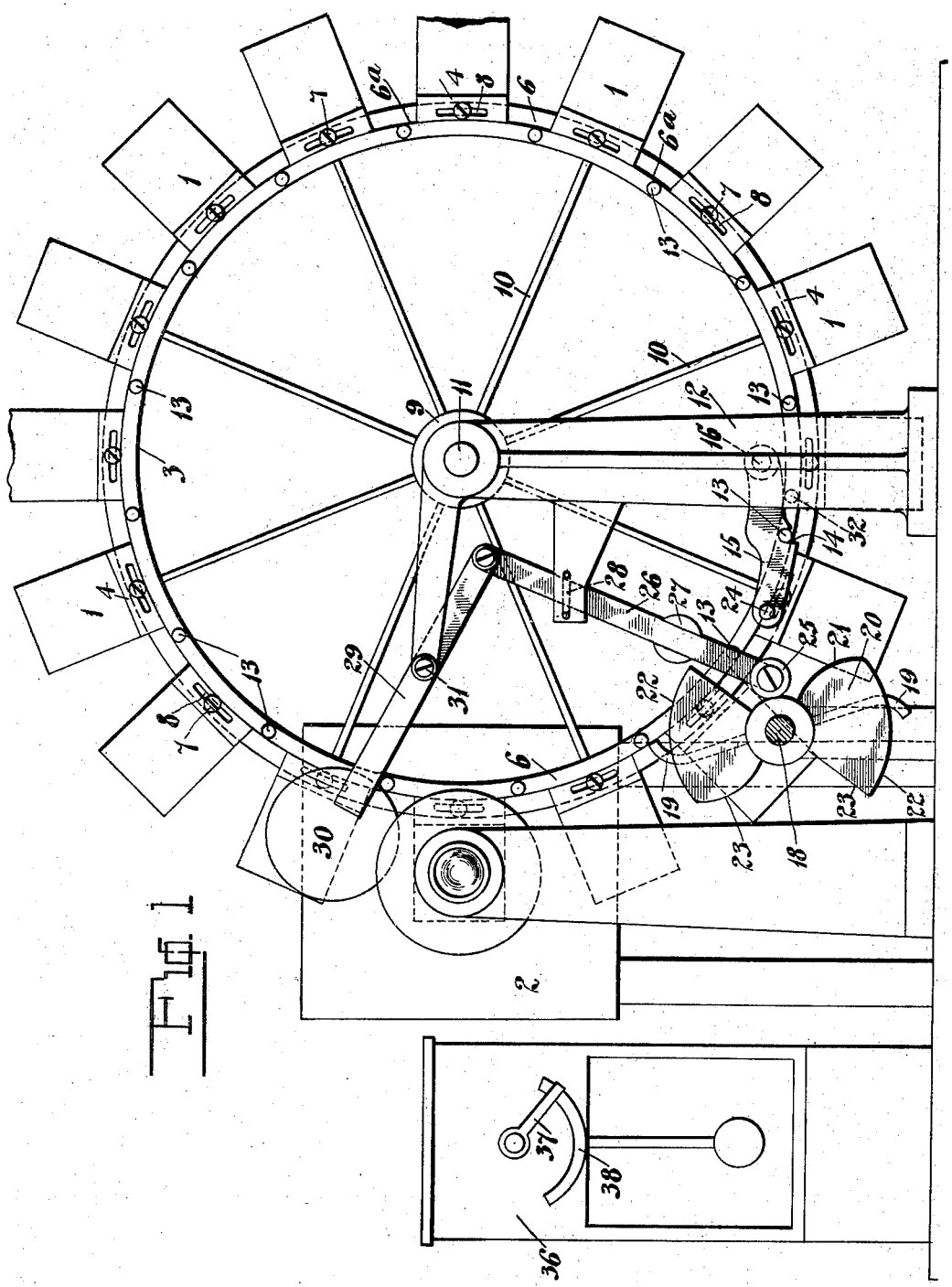

No. 737,940. PATENTED SEPT. 1, 1903.
J. B. LEATHERBARROW.
CARD, PICTURE, OR SIGN EXHIBITOR.
APPLICATION FILED MAY 20, 1903.
NO MODEL. 3 SHEETS—SHEET 1.

Witnesses
Inventor
Joseph B. Leatherbarrow
By his Attorneys

No. 737,940. PATENTED SEPT. 1, 1903.
J. B. LEATHERBARROW.
CARD, PICTURE, OR SIGN EXHIBITOR.
APPLICATION FILED MAY 20, 1903.
NO MODEL. 3 SHEETS—SHEET 2.
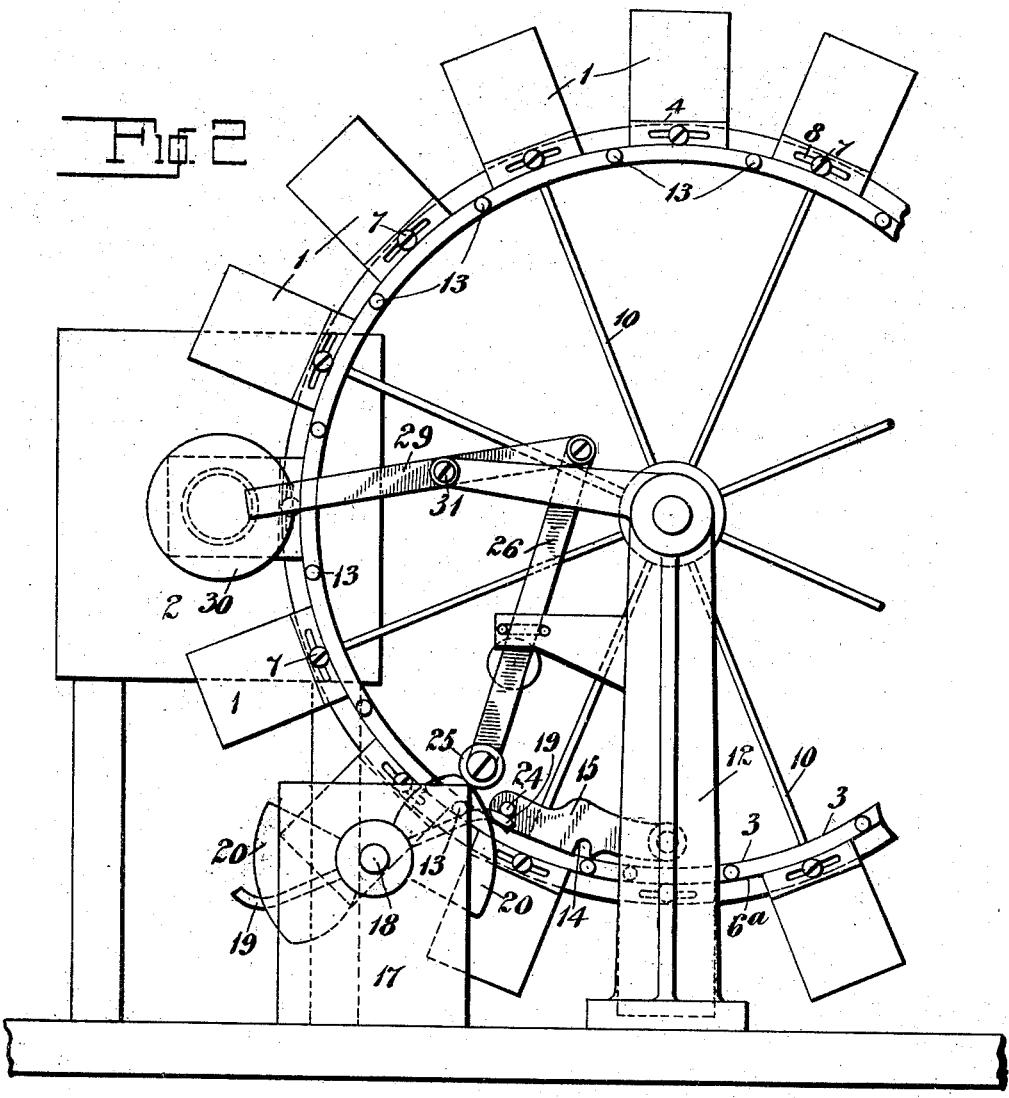
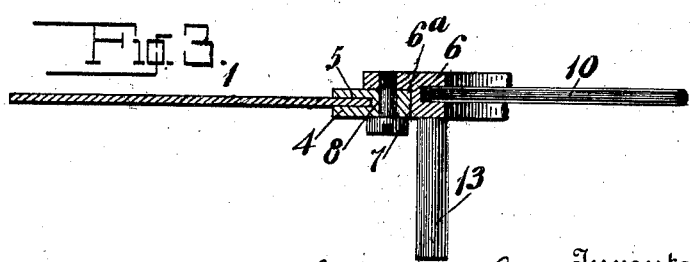

No. 737,940. PATENTED SEPT. 1, 1903.
J. B. LEATHERBARROW.
CARD, PICTURE, OR SIGN EXHIBITOR.
APPLICATION FILED MAY 20, 1903.
NO MODEL. 3 SHEETS—SHEET 3.
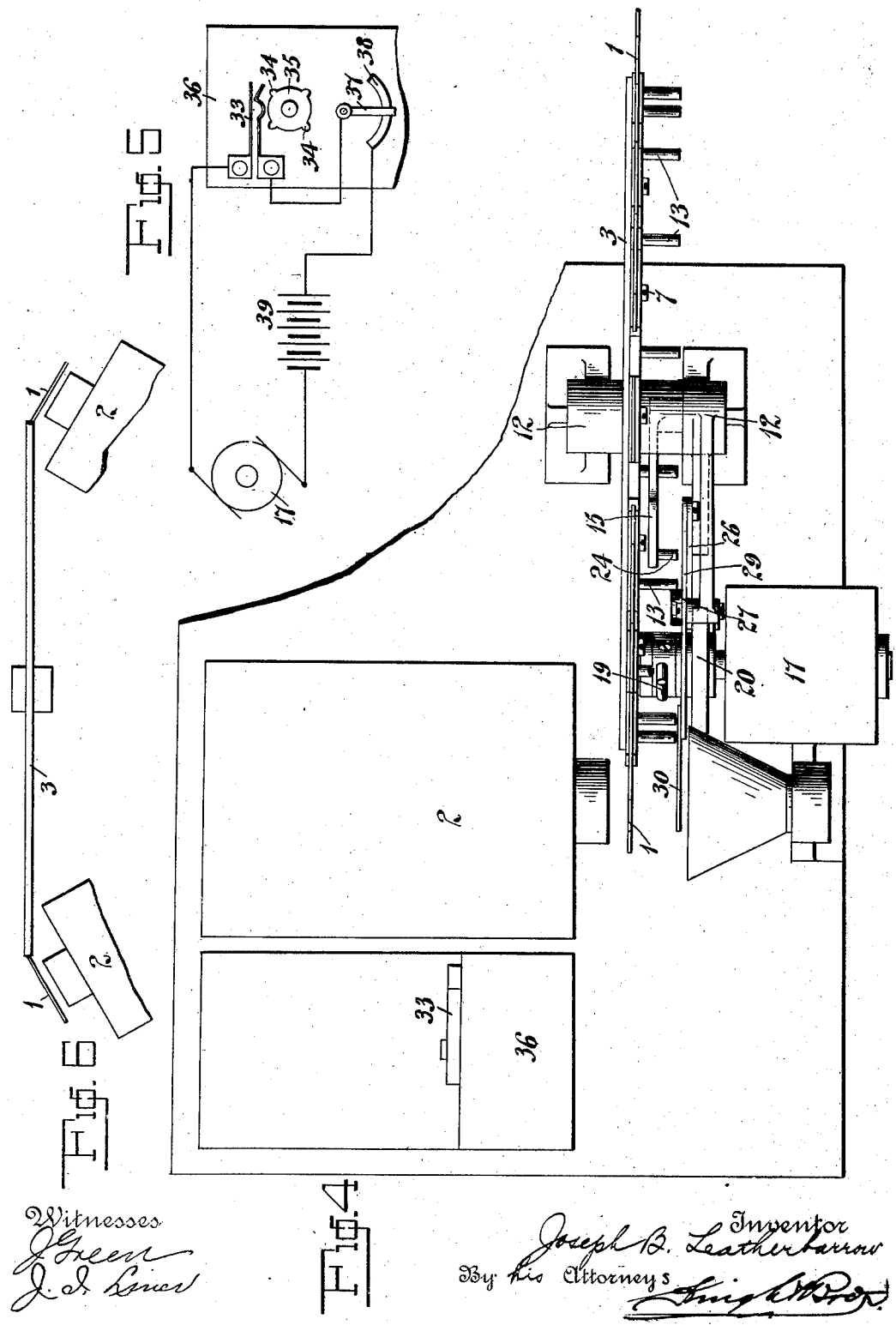

No. 737,940. Patented September 1, 1903.

UNITED STATES PATENT OFFICE.

JOSEPH B. LEATHERBARROW, OF NEW YORK, N. Y., ASSIGNOR, BY DIRECT AND MESNE ASSIGNMENTS, TO DISPLAY MACHINE COMPANY, OF EAST ORANGE, NEW JERSEY, A CORPORATION OF NEW JERSEY.

CARD, PICTURE, OR SIGN EXHIBITOR.

SPECIFICATION forming part of Letters Patent No. 737,940, dated September 1, 1903.

Application filed May 20, 1903. Serial No. 157,949. (No model.)

*To all whom it may concern:*

Be it known that I, JOSEPH B. LEATHERBARROW, a citizen of the United States, residing in the borough of Manhattan, in the city and State of New York, have invented certain new and useful Improvements in Card, Picture, or Sign Exhibitors, of which the following is a specification.

My invention relates to that class of apparatus designed for the display of cards, pictures, signs, and the like by throwing the same consecutively on a screen; and the invention consists in certain details of construction and combinations of parts, which will be more definitely pointed out in the claims, and which are designed to render the apparatus simple and perfect in operation.

In the accompanying drawings, Figure 1 is a front elevation of the apparatus, the motor being omitted. Fig. 2 is a similar view of part of the apparatus, shown in the position assumed at the moment of changing a picture. Fig. 3 is a sectional view showing the method of attaching a picture to the displaying-wheel. Fig. 4 is a top view of the apparatus. Fig. 5 is a diagrammatic view of the electric circuit controlling the displaying-wheel. Fig. 6 is a top view illustrating a modified method of mounting the plates or pictures on the displaying-wheel adapted to the simultaneous exposure of the cards, pictures, &c., at two points.

The apparatus is designed for the display on a suitable screen (not here illustrated) of cards, pictures, signs, and the like placed on photographic plates 1. These plates are brought consecutively into position between the lens and the light of a magic lantern 2, and thereby displayed suitably enlarged upon the screen. It is important that the plate be held stationary while its card or picture is being displayed, that it be quickly shifted to allow the following card or picture to be displayed, and that while the change is being effected the light shall be obscured and then quickly thrown on as soon as the next succeeding card or picture is in place. The plates 1, usually of glass and having the card, picture, or sign placed thereon photographically, are mounted at equal distances apart on the periphery of a wheel 3. The means of attachment are shown in Figs. 1 and 3. For each plate 1 I provide a base-piece 4, which may be of wood or other material and which is slotted at 5, as shown in Fig. 3, to receive the edge of the plate 1, which is then held in the slot by glue or otherwise. The base-piece 4 is fastened to the rim 6 of wheel 3 by means of a set-screw 7, passing through a slot 8 (see Fig. 1) in the base-piece 4. In this way the capacity for peripheral adjustment of the plates is provided, so that they may be accurately positioned with respect to each other and to the exposing-point.

The construction of the wheel 3 may be as shown, having the metallic rim 6 shouldered at $6^a$ to receive the base-pieces of the plates 1 and supported on the hub 9 by the suspension-spokes 10. The hub 9 has, preferably, ball-bearing support on the axle 11, mounted in the stationary frame 12, the whole structure being by reason of its lightness and lack of friction adapted to move promptly and with the least exertion of power on the part of the driving mechanism and also to be stopped quickly and without undue shock and wear and tear of the apparatus.

Projecting laterally from the rim 6 of the wheel 3 are a series of locking-pins 13, with which the jaw 14 of holding-dog 15, pivoted at 16 to the stationary support, engages to hold the wheel during the interval of time while a picture is being displayed.

The motor 17 (merely indicated in Fig. 2 by its casing) has its shaft 18 projecting under the wheel 3. It carries oppositely-projecting arms 19 having rounded outer ends. It also carries two oppositely-arranged cams 20, having the rounded face 21, the edge 22 concentric with the shaft 18, and the steep drop 23. The arms 19 engage by their rounded outer ends with a pin 24 on the outer end of the dog 15 to unlock the wheel and with pins 13 on the rim of the wheel 3, propelling the wheel. The cams 20 engage by their rounded face 21 with an antifriction-roller 25 on the lower end of a sliding bar 26, which may have a weight or spring 27 to hold it normally in its lower position and which is guided by a strap 28 on a stationary part of the frame. From the rounded face 21 of the cam 20 said antifriction-roller passes to the concentric portion 22 of the cam and thence to the drop 23. The upper end of the bar 26 is pivoted to the arm 29 on the shutter 30, said arm being pivoted at 31 to a stationary part of the frame. When the motor is started in the manner to be presently described, the cam-surface 21, which is somewhat in advance of the arm 19, strikes the antifriction-roller 25, and so brings the shutter 30 down to obscure the light. Immediately thereafter the arm 19 strikes the pin 24, unlocking the dog 15 from one of the pins 13, and at the same instant the arm 19 strikes the next forward pin 13, as shown in Fig. 2, thus propelling the wheel to the next position. The face 22 of the cam 20 holds the shutter closed while the pictures are being changed, and the pin 13, which has just been released by the dog 15, holds that dog up until the said pin 13 has passed beyond the end of the dog. At this point the dog drops over the next succeeding pin 13, the roller 25 drops into the radial part 23 of the cam, and simultaneously the wheel is locked in position and the shutter opened.

The pin 32 is for the purpose of holding the dog 15 from accidental dropping and is fastened to the stationary part of the frame.

The motor 17 is preferably controlled so as to expose the cards, pictures, or the like for short period and at regular intervals. It is shown in Fig. 5 connected in circuit with a pair of contacts 33, which are closed by projections 34, carried by a disk 35 on the seconds-arbor of a clock 36. The electric circuit also includes a contact-arm 37, carried by the hour-hand, which sweeps over a contact-plate 38, so that the motor-circuit is closed only during such part of twenty-four hours as may be desired. The current for the circuit may be derived from a battery 39 or other source. The clock employed may be electrically operated, current being derived from the same source as that employed for the motor 17, or the clock may be of any other desired construction.

In Fig. 6 I have exhibited a method of arranging the plates on opposite sides of the wheel at a slight angle and in line with two separate magic lanterns, so as to expose the cards, pictures, and the like on two different screens, which may, for example, be on two sides of a corner building where the apparatus is used for advertising purposes.

Having thus described my invention, what I claim as new therein, and desire to secure by Letters Patent, is—

1. In an apparatus for exhibiting cards, pictures, signs and the like, the combination of a plate-carrying device adapted to support a number of plates to be consecutively exposed, a holding device for retaining the plate-carrying device while a plate is being exposed, a shutter, a propelling-motor for the plate-carrying device, and means controlled thereby for releasing said holding device and operating said shutter, substantially as set forth.

2. In an apparatus of the character described, the combination of the plate-carrying wheel having locking-pins, a locking-dog adapted to engage said pins, a motor, and arms driven by said motor to unlock said dog and engage said wheel for propelling it, substantially as set forth.

3. In an apparatus of the character described, the combination of the plate-carrying wheel having locking-pins, a locking-dog adapted to engage said pins, a motor, and arms driven by said motor to unlock said dog and engage said wheel for propelling it, substantially as set forth.

4. In an apparatus of the character described, the combination of a plate-carrying wheel, a shutter, carrying and operating arms for said shutter, a motor, its shaft having propelling-arms for said wheel and cams also operated by said shaft for actuating said shutter, substantially as set forth.

5. In an apparatus of the character described, the combination of the shutter, its carrying-arm and operating-bar, a propelling-motor having operative connection with the wheel and cams driven by said motor and having the faces as described for throwing the shutter into position to obscure a plate for holding it there while the plate is being shifted and for allowing the shutter to be quickly withdrawn, substantially as set forth.

6. In an apparatus of the character described, the combination of the plate-carrying wheel 3, having locking and propelling pins 13, a locking-dog having a jaw to engage said pins, a motor having operating-arms adapted to engage said dog and said pins, the dog having a surface adapted to ride on said pins while the wheel is being shifted, substantially as set forth.

7. In an apparatus of the character described, the combination of a clock mechanism, an electric circuit including a propelling-motor, and contact devices controlled by said clock, a plate-carrying device, a shutter, and a locking device for said plate-carrying device and operative connection from said motor to operate said shutter, unlock said locking device and propel the plate-carrying device, substantially as set forth.

8. In an apparatus for exhibiting cards, pictures, signs and the like, the combination of a plate-carrying device adapted to support a number of plates so as to be consecutively exposed, a motor-driven axle, cam-surfaces and arms secured upon said axle for automatically operating the shutter and the intermittent movement of the plate-carrying device so as to keep the shutter closed during the turn of the latter, a pivoted dog for retaining the plate-carrying device during the exposure of the plates, but unlocking said plate-carrying device through the action of said arms on the operating-shaft.

JOSEPH B. LEATHERBARROW.

Witnesses:
J. GREEN,
WILLIAM PIERSON HAMMOND.